United States Patent
Strengert et al.

(10) Patent No.: US 9,067,578 B2
(45) Date of Patent: Jun. 30, 2015

(54) METHOD FOR OPERATING A REGENERATIVE BRAKING SYSTEM OF A VEHICLE AND CONTROL UNIT FOR A REGENERATIVE BRAKING SYSTEM OF A VEHICLE

(71) Applicants: Stefan Strengert, Stuttgart (DE); Michael Kunz, Steinheim an der Murr (DE); Dirk Drotleff, Oberstenfeld (DE)

(72) Inventors: Stefan Strengert, Stuttgart (DE); Michael Kunz, Steinheim an der Murr (DE); Dirk Drotleff, Oberstenfeld (DE)

(73) Assignee: ROBERT BOSCH GMBH, Stuttgart (DE)

(*) Notice: Subject to any disclaimer, the term of this patent is extended or adjusted under 35 U.S.C. 154(b) by 86 days.

(21) Appl. No.: 13/908,340

(22) Filed: Jun. 3, 2013

(65) Prior Publication Data
US 2013/0328386 A1 Dec. 12, 2013

(30) Foreign Application Priority Data
Jun. 6, 2012 (DE) .................. 10 2012 209 522

(51) Int. Cl.
| | |
|---|---|
| B60T 8/64 | (2006.01) |
| B60T 13/74 | (2006.01) |
| B60T 13/58 | (2006.01) |
| B60T 1/10 | (2006.01) |
| B60T 8/40 | (2006.01) |
| B60T 8/48 | (2006.01) |

(52) U.S. Cl.
CPC ................ *B60T 13/586* (2013.01); *B60T 1/10* (2013.01); *B60T 8/4054* (2013.01); *B60T 8/4072* (2013.01); *B60T 8/4872* (2013.01); *B60T 2270/604* (2013.01)

(58) Field of Classification Search
CPC .............................. B60T 13/585; B60T 13/586
USPC ........................................ 303/151, 152; 701/22
See application file for complete search history.

(56) References Cited

U.S. PATENT DOCUMENTS

| | | | | |
|---|---|---|---|---|
| 5,378,053 A | * | 1/1995 | Patient et al. ................ | 303/152 |
| 8,746,813 B2 | * | 6/2014 | Matsushita .................. | 303/152 |

FOREIGN PATENT DOCUMENTS

DE 10 2009 001 401 9/2010
WO WO 2010128652 A1 * 11/2010

* cited by examiner

*Primary Examiner* — Thomas J Williams
(74) *Attorney, Agent, or Firm* — Kenyon & Kenyon LLP

(57) ABSTRACT

A method/controller for operating a vehicle regenerative braking system by operating in a first braking mode, in which a generator braking torque of a generator is not zero and is equal to a first regenerative portion predefined for the first mode, and controlling the system out of the first mode into a second braking mode having a second regenerative portion, which is smaller than the first portion, so that brake fluid is pumped out of a storage volume of the system into at least one wheel brake cylinder and/or at least one brake circuit of the system via at least one brake fluid delivery mechanism; by activating the delivery mechanism via a setpoint delivery output variable, which is established/predefined for a setpoint brake pressure having a setpoint pressure rise which increases over time, so that an actual brake pressure having an actual pressure rise increase over time is built up.

15 Claims, 3 Drawing Sheets

METHOD FOR OPERATING A REGENERATIVE BRAKING SYSTEM OF A VEHICLE AND CONTROL UNIT FOR A REGENERATIVE BRAKING SYSTEM OF A VEHICLE

RELATED APPLICATION INFORMATION

The present application claims priority to and the benefit of German patent application no. 10 2012 209 522.5, which was filed in Germany on Jun. 6, 2012, the disclosure of which is incorporated herein by reference.

FIELD OF THE INVENTION

The present invention relates to a method for operating a regenerative braking system of a vehicle. In addition, the present invention relates to a control unit for a regenerative braking system of a vehicle.

BACKGROUND INFORMATION

German patent document DE 10 2009 001 401 A1 discusses a braking system for a vehicle, which may be equipped with a generator. FIG. 1 shows a coordinate system to illustrate a traditional mode of operation of such a braking system having a generator. The abscissa of the coordinate system in FIG. 1 is time axis t.

Starting at a point in time t0', a driver of a vehicle braked according to the traditional mode of operation actuates a brake actuating element, e.g., a brake pedal. A brake actuation distance s (in mm) by which the brake actuating element is adjusted therefore increases as of time t0' starting from an initial brake actuation distance s0. Initial brake actuation distance s0 may be equal to zero, for example.

Between times t0' and t1' (time interval A'), the vehicle, which was previously driving at a vehicle velocity v (in m/s) equal to an initial velocity v0, is braked by purely regenerative braking. Therefore, a brake pressure buildup in at least one brake circuit of the vehicle between times t0' and t1' is prevented despite the fact that brake actuation distance s is not equal to initial brake actuation distance s0. This may be accomplished by temporarily storing the brake fluid, transferred out of a brake master cylinder, within at least one storage volume, for example. Furthermore, a generator is activated between times t0' and t1' in such a way that a generator braking torque M_gen (in Nm) not equal to zero (which may correspond to brake actuation distance s) is exerted on at least one wheel of the vehicle.

However, to protect the generator, it is usually necessary to reduce the applied generator braking torque M_gen to zero before the vehicle comes to a standstill. In the traditional mode of operation of the braking system shown in FIG. 1, a setpoint generator braking torque (not illustrated) which declines (almost) linearly over time between times t1' and t2' (time interval B') is predefined for the generator. To replace the braking effect of the generator which is lost due to the reduction of generator braking torque M_gen, an (almost) linearly increasing setpoint brake pressure/target pressure p_setpoint (in bar) (starting from an initial brake pressure p0) should be built up in at least one brake circuit and/or at least one wheel brake cylinder of the braking system between times t1' and t2'. For this purpose, the at least one pump is usually used with the aid of which the brake fluid is pumped out of the at least one storage volume of the braking system into the at least one wheel brake cylinder and/or the at least one brake circuit between times t1' and t2'.

At the start of the brake pressure buildup in the at least one wheel brake cylinder and/or the at least one brake circuit, a dead volume of the hydraulic braking system must often be overcome first. Furthermore, a braking system often has a comparatively high elasticity in the presence of a relatively low brake pressure in the at least one brake circuit. Therefore, at the start of a brake pressure buildup in a braking system, a comparatively large brake fluid volume must be transferred/pumped in comparison with the increase in pressure in the at least one brake circuit and/or the at least one wheel brake cylinder.

To achieve an actual brake pressure p_actual (in bar) according to predefined setpoint brake pressure/target pressure p_setpoint, the at least one pump must thus pump a comparatively large brake fluid volume into the at least one brake circuit and/or into the at least one wheel brake cylinder between times t1' and t1a', during which the initial phase of the brake pressure buildup occurs. Thus, as shown on the basis of FIG. 1, a comparatively high setpoint rotational speed n_setpoint (in 1/min) is to be implemented by the at least one pump to induce actual brake pressure p_actual, which is approximated to setpoint brake pressure p_setpoint, in the at least one wheel brake cylinder and/or the at least one brake circuit. For example, setpoint rotational speed n_setpoint, which is to be implemented by the at least one pump, is also still comparatively high between times t1a' and t1b'. Setpoint rotational speed n_setpoint may be greater than 1000 revolutions per minute, in particular greater than 1500 revolutions per minute, between times t1' and t1a' and/or between times t1a' and t1b'. This means a relatively high pump efficiency for the at least one pump. Only between times t1b' and t2', when the linear range of the volume-pressure characteristic of the braking system has been reached, will setpoint rotational speed n_setpoint be able to decline to a stationary level.

SUMMARY OF THE INVENTION

The present invention provides a method for operating a regenerative braking system of a vehicle having the features described herein, a control unit for a regenerative braking system of a vehicle having the features described herein and a regenerative braking system for a vehicle having the features described herein.

The present invention permits a brake pressure buildup in the at least one brake circuit and/or the at least one wheel brake cylinder exclusively by operation of the at least one brake fluid delivery mechanism at relatively low delivery rates to compensate for the generator braking action being omitted in controlling the braking system out of the first braking mode into the second braking mode. A pressure buildup which is low in noise and vibration is implementable due to operation of the at least one brake fluid delivery mechanism at relatively low delivery rates, e.g., low pump rotational speeds. There is thus no need for applying insulation to shield the occupants of the vehicle from a noise burden and/or a vibration burden during the pressure buildup. In addition, the delivery rate implemented by the at least one brake fluid delivery mechanism should be optimized by the present invention with regard to a suppressed/low noise level as well as with regard to the desired high demands regarding dynamics and efficiency.

Furthermore, the actual brake pressure, which is implementable via the present invention in the at least one brake circuit/wheel brake cylinder, is implementable within a relatively short time interval, so that the point in time for termination of a purely regenerative brake phase may be extended. A high regenerative efficiency is advantageously achievable due to the comparatively long regenerative braking of the vehicle, which is implementable via the present invention.

As explained in greater detail below, a more homogeneous deceleration characteristic may be implemented via the present invention. Regenerative deceleration in particular may be regulated in accordance with the prevailing hydraulic deceleration.

In one advantageous specific embodiment of the method, during the activation of the at least one brake fluid delivery mechanism via the established or predefined setpoint delivery output variable, a setpoint generator braking torque of the generator is established while taking into account the total setpoint braking torque and a variable with respect to a hydraulic brake pressure built up in the at least one wheel brake cylinder and/or the at least one brake circuit. Subsequently, the generator braking torque of the generator is adjusted similarly. In this way the high dynamics and good regulability of the generator in comparison with the properties of the hydraulic portions of the operated braking system may be utilized for more reliably maintaining the total setpoint braking torque. In particular in this way the hydraulic pressure in the at least one brake circuit and/or in the at least one wheel brake cylinder may be built up volumetrically at comparatively low pump speeds, in particular at a low constant pump speed, for the desired masking of the generator braking action being omitted. The generator may be controlled/regulated easily in such a way that the generator braking torque is reduced in accordance with the brake pressure already built up, i.e., the hydraulic braking torque induced in this way.

For example, a setpoint rotational speed which is constant over time and/or an operating current which is constant over time may be provided as the setpoint delivery output variable(s) on at least one pump as the at least one brake fluid delivery mechanism. Thus, in particular despite having to overcome air gaps/tolerances and a high elasticity of the braking system at the start of a brake pressure buildup, the present invention enables the advantageous actual brake pressure by operation of the at least one pump at a constant pump speed. The pump speed, which may thus be maintained at a constant level, may be established in such a way that the occurrence of noise/vibration is reliably suppressed.

As an alternative, a setpoint rotational speed which increases linearly over time starting from an initial rotational speed up to a target rotational speed and/or an operating current which increases linearly over time starting from an initial operating current up to a target operating current may also be provided as the setpoint delivery output variable(s) to at least one pump as the at least one brake fluid delivery mechanism. Thus a warmup-optimized activation profile may also be implemented/simulated via the at least one pump to achieve the desired actual brake pressure for masking the generator braking action being omitted.

During the activation of the at least one brake fluid delivery mechanism via the established or predefined setpoint delivery output variable, the generator braking torque of the generator may be reduced at an established or predefined negative slope, the absolute value of which increases over time. The decrease in the generator braking torque over time may thus be advantageously adapted to the increase over time in the hydraulic braking torque of the at least one wheel brake cylinder which is induced via the actual brake pressure implemented.

In one advantageous refinement, during the activation of the at least one brake fluid delivery mechanism, the generator braking torque of the generator is reduced at a negative slope, the absolute value of which increases over time, via the established or predefined setpoint delivery output variable, so that a time characteristic of the generator braking torque corresponds to a regressively declining braking torque graph. Furthermore, the setpoint delivery output variable may also be established or predefined in accordance with a progressively increasing pressure buildup graph as the setpoint brake pressure having the setpoint pressure rise which increases over time. The increase in the actual brake pressure over time and the decrease in the generator braking torque over time may thus be advantageously adapted to one another via easily implementable method steps. This ensures reliably maintaining the predefined total setpoint braking torque despite the masking implemented.

For example, the braking system may be operated in a fully regenerative braking mode as the first braking mode in which the first regenerative portion is equal to 100%. In addition, the generator braking torque may be reduced to zero while the braking system is controlled out of the first braking mode into the second braking mode, the braking system then being operated in a fully hydraulic braking mode as the second braking mode, in which the second regenerative portion is equal to 0%. The present invention thus permits an advantageous transition from the fully regenerative braking mode to the fully hydraulic braking mode while reliably maintaining the predefined total setpoint braking torque at the same time.

The advantages established above are also reliably ensured even with such a control unit for a regenerative braking system of a vehicle.

Furthermore, the advantages are also achievable via a regenerative braking system having a corresponding control unit.

Additional features and advantages of the present invention are explained below on the basis of the figures.

DETAILED DESCRIPTION

Figure 2A:
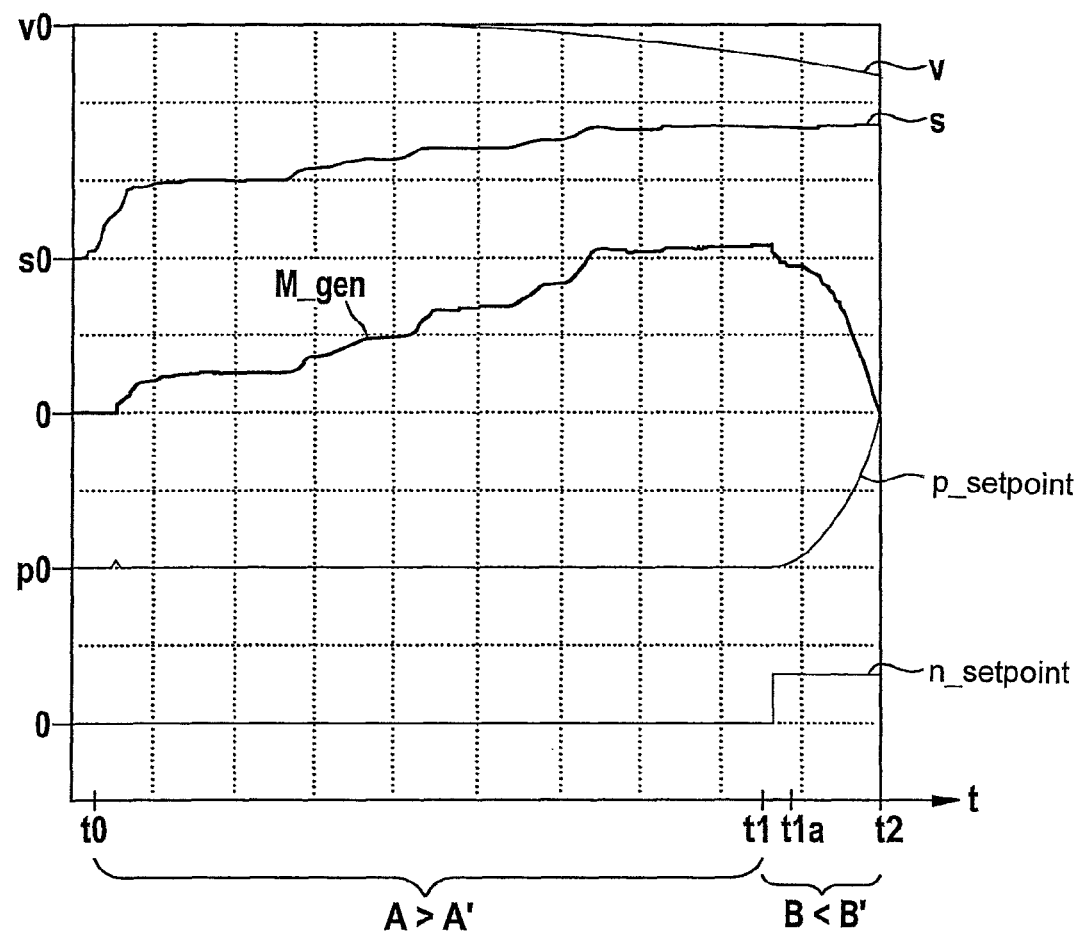
FIGS. 2a and 2b show coordinate systems for illustrating the method for operating a regenerative braking system of a vehicle.
Figure 2B:
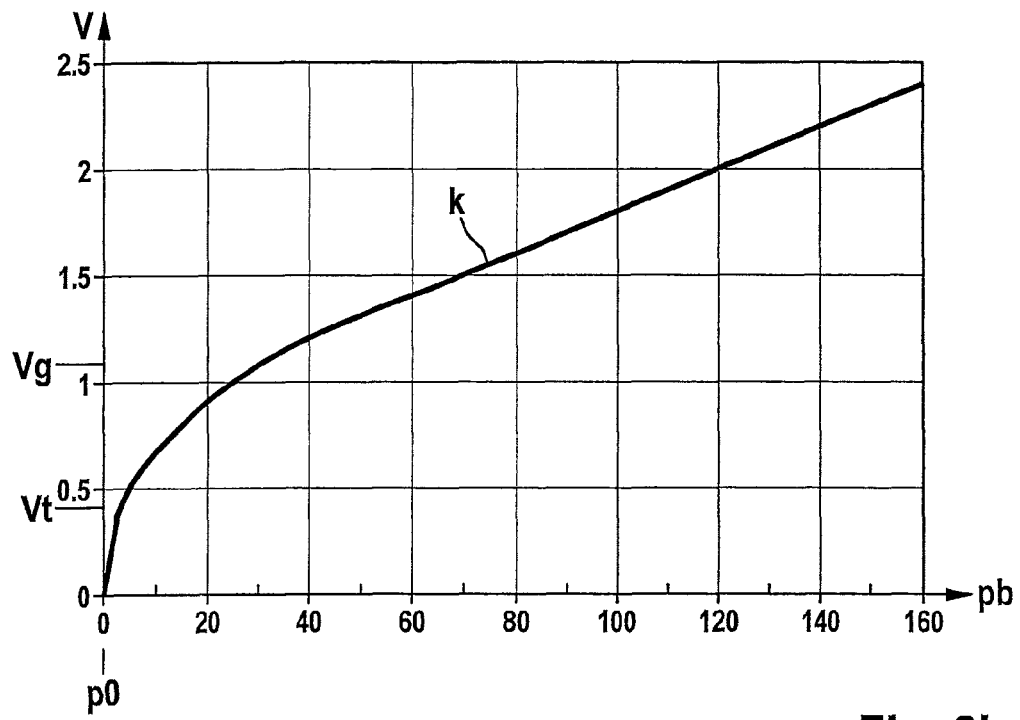

FIGS. 2a and 2b show coordinate systems for illustrating the method for operating a hydraulic braking system of a vehicle.

The method represented schematically in FIG. 2a is implementable via a plurality of braking systems of different types. The implementability of this method is therefore not limited to a certain design of the braking system used here for this purpose. In particular the coordinate system of FIG. 2b represents only a pressure-volume characteristic line k of a braking system, for which the implementation of this method is particularly advantageous. However, the implementability of this method is not limited to such a pressure-volume characteristic line k of the braking system used for this purpose.

FIG. 2b represents a pressure-volume characteristic line k of a regenerative braking system for which the use/implementation of the method described below is particularly advantageous. The abscissa of the coordinate system in FIG. 2b indicates a brake fluid volume V (in cubic centimeters/$cm^3$) which is transferred from a brake master cylinder and/or a storage volume such as a brake fluid reservoir and/or a storage chamber within the brake circuit (e.g., a low-pressure storage chamber) to at least one brake circuit of the regenerative braking system to increase a brake pressure pb in the at least one brake circuit and/or at least one wheel brake cylinder, which is connected to the brake circuit. The abscissa of the coordinate system in FIG. 2b corresponds to a resulting brake pressure pb (in bar).

On the basis of pressure-volume characteristic line k of the coordinate system in FIG. 2b, it is recognizable that at a desired brake pressure buildup, a so-called dead volume Vt is first to be displaced to the at least one brake circuit before brake pressure pb becomes unequal to an initial brake pressure p0, which is (almost) equal to atmospheric pressure, for example. This dead volume Vt to be displaced is usually necessary to overcome the air gaps and tolerances in the braking system. Thus there is always still a brake pressure pb which is (almost) equal to initial brake pressure p0 in the case of a displaced brake fluid volume V between zero and dead volume Vt.

A displacement in a brake fluid volume V between dead volume Vt and a limiting volume Vg results in a comparatively minor increase in the brake pressure with regard to the quantity of brake fluid displaced. This is due to the fact that a braking system often has a low volume-pressure transmission ratio at a comparatively low brake pressure pb. This may also be rewritten by saying that a braking system will often have a comparatively high elasticity when a relatively low brake pressure pb prevails in its at least one brake circuit. One therefore also speaks of a "soft" initial range of a braking system in the case of a brake pressure buildup. A further increase in displaced brake fluid volume V is associated with a more rapid increase in brake pressure pb only starting from a brake fluid volume V, which is equal to limiting volume Vg and has been displaced into the at least one brake circuit.

However, despite the characteristic of pressure-volume characteristic line k represented in FIG. 2b, an advantageous masking of a generator braking torque M_gen, which declines over time, is implementable via the method described below. To illustrate the method, reference is made below to the coordinate system of FIG. 2a, the abscissa of which is time axis t.

Starting at a point in time t0, when the vehicle is driving at a vehicle velocity v (in m/s), which is equal to an initial velocity v0, the driver of a vehicle being braked with the aid of the method described here actuates a brake actuating element, for example, a brake pedal. Starting at point in time t0, this results in an increase in a brake actuation distance s (in mm) by which the brake actuating element is adjusted out of its starting position (without actuation). (Before point in time t0 brake actuation distance s is (almost) equal to an initial brake actuation distance s0, which may be equal to zero.)

Between times t0 and t1 (interval A), comparatively high initial velocity v0 is used to operate the braking system in a first braking mode, in which a generator braking torque M_gen (in Nm) of a generator of the braking system not equal to zero is used to brake the vehicle. Generator braking torque M_gen exerted on at least one wheel and/or at least one axle of the vehicle is equal to a first regenerative portion, predefined for the first braking mode, of a total setpoint braking torque, which is predefined by the driver (or by an adaptive cruise control). As may be seen in FIG. 2a, generator braking torque M_gen may correlate with brake actuation distance s of the brake actuating element, e.g., may be proportional to brake actuation distance s. The braking system may be operated between times t0 and t1 in a fully regenerative braking mode as the first braking mode in which the first regenerative portion is equal to 100%. In this case generator braking torque M_gen corresponds to the total setpoint braking torque requested by the driver (or by the adaptive cruise control).

Initial operation of the regenerative braking system in the fully regenerative braking mode as the first braking mode is associated with the advantage that a comparatively large quantity of electrical energy thereby recovered may be fed back into a battery. This recovered energy may be utilized for renewed acceleration of the vehicle at a later point in time, for example. The advantageous specific embodiment of the method described here may thus be utilized for a significant reduction in energy consumption and/or in the pollution emissions of the vehicle. However, it is pointed out that the implementability of the method described here is not limited to the implementation of the fully regenerative braking mode as the first braking mode.

In one advantageous specific embodiment of the method described here, a brake pressure buildup in at least one brake circuit of the vehicle is prevented between times t0 and t1 despite brake actuation distance s not being equal to initial brake actuation distance s0 in that the brake fluid transferred out of a brake master cylinder is stored temporarily in the at least one storage volume, such as a low-pressure storage chamber, for example. An initial brake pressure p0 may also be (almost) maintained in the at least one brake circuit in this way during times t0 and t1. However, the implementation of this method step is optional.

The implementability of the method described here is not limited to a certain type of generator used. For example, the electric motor used for the electric drive of the vehicle may also be used as the generator.

As a rule, to protect the generator during the braking action of a vehicle, it is advantageous to reduce generator braking torque M_gen to zero before the vehicle comes to a stop. At the same time, it is desirable to (almost) maintain the total setpoint braking torque requested by the driver (or the adaptive cruise control) despite the reduction in generator braking torque M_gen. Thus, to ensure braking convenience, it is advantageous for the driver if reduced generator braking torque M_gen is at least partially compensated by a hydraulic braking torque of at least one wheel brake cylinder of the braking system.

In the method described here, the braking system is controlled between times t1 and t2 (time interval B) out of the first braking mode into a second braking mode having a second regenerative portion which is smaller than the first regenerative portion. Generator braking torque M_gen in particular may be reduced to zero while the braking system is being controlled out of the first braking mode into the second braking mode. Subsequently, the braking system may be operated in a fully hydraulic braking mode as the second braking mode, in which the second regenerative portion is equal to 0%. However, the method described below is not limited to such a great reduction in the regenerative portion in the second braking mode.

For transferring the braking system from the first braking mode into the second braking mode, at least one pump, as the brake fluid delivery mechanism of the braking system, is activated in such a way that brake fluid is pumped by at least one activated pump out of a storage volume of the braking system into at least one wheel brake cylinder and/or at least one brake circuit of the braking system. The at least one pump activated to do so may be, for example, a pump situated in the at least one brake circuit, in particular a piston pump, using which brake fluid is pumpable out of a storage chamber (e.g., a low-pressure storage chamber) of the at least one associated brake circuit in the direction of the at least one connected wheel brake cylinder. Use of at least one piston pump is associated with the advantage that with this type of pump, the delivery volume flow is proportional to the pump speed. However, the implementability of the method is not limited to a certain type of a pump used for this purpose and/or a storage volume used. Another possibility for building up pressure, e.g., at least one valve and/or a pressure storage, may also be used as the brake fluid delivery mechanism.

The at least one brake fluid delivery mechanism is activated between times t1 and t2 by a pump efficiency variable, which is established or predefined for a setpoint brake pressure p_setpoint (in bar) having a setpoint pressure rise over time. FIG. 2a shows setpoint brake pressure p_setpoint which is established for activating the at least one brake fluid delivery mechanism, this setpoint brake pressure having a setpoint pressure rise between times t1 and t2, which increases over time. Taking the same into account, the setpoint delivery output variable is establishable or predefinable. The setpoint delivery output variable may be, for example, a setpoint rotational speed n_setpoint (in revolutions per minute) and/or a provided operating current of the at least one pump. FIG. 2a indicates a setpoint rotational speed n_setpoint as the at least one setpoint delivery output variable. However, it is pointed out that the activation of the at least one pump is not limited to the use of such a setpoint parameter.

Due to the advantageous activation described in the preceding paragraph, an actual brake pressure (not shown in the drawing), having an actual pressure rise which increases over time, is built up via the at least one activated pump between times t1 and t2 in the at least one wheel brake cylinder and/or the at least one brake circuit. (The actual brake pressure having an actual pressure rise, which increases over time, may be, in particular, equal to setpoint brake pressure p_setpoint, which is plotted in FIG. 2a in the method described here.) Thus, by activating the at least one pump, a volume flow, the volume flow rise of which decreases over time, is delivered in accordance with the pump speed/pump efficiency implemented by the at least one pump into the at least one brake circuit by activating the at least one pump. Due to the brake pressure buildup achieved in this way, it is therefore also possible to achieve an increase over time in the actual braking torque rise of the hydraulic braking torque of the at least one wheel brake cylinder.

Before activating the at least one pump, setpoint brake pressure p_setpoint having a setpoint pressure rise, which increases over time, may be established directly. Instead of a direct establishment, setpoint brake pressure p_setpoint, having a setpoint pressure rise which increases over time, may also be predefined indirectly by establishing/predefining the pump efficiency variable to be implemented by the at least one pump between times t1 and t2.

Setpoint brake pressure p_setpoint having a setpoint pressure rise which increases over time may be understood to be a pressure whose time derivation increases between times t1 and t2. The increase in the time derivation of setpoint brake pressure p_setpoint, having the setpoint pressure rise which increases over time, may be in particular linear between times t1 and t2. Setpoint brake pressure p_setpoint having the setpoint pressure rise which increases over time may thus be understood to be a (hydraulic) setpoint brake pressure p_setpoint, which rises/increases progressively between times t1 and t2. Accordingly, the actual brake pressure having an actual pressure rise which increases over time may also be rewritten as a (hydraulic) setpoint brake pressure p_setpoint which rises/increases progressively between times t1 and t2.

The method step implemented between times t1 and t2 may be rewritten as a volumetric brake pressure buildup. It is pointed out that a significant brake pressure pb may be built up comparatively rapidly with the aid of the volumetric brake pressure buildup even in a braking system having "delayed" pressure-volume characteristic line k shown in FIG. 2b. At the same time, the hydraulic braking torque of the at least one wheel brake cylinder may be increased via the volumetric brake pressure buildup during a reduction of generator braking torque M_gen in such a way that the braking intent desired by the driver (or the adaptive cruise control) may be reliably/completely met.

Furthermore, it is pointed out that by directly or indirectly predefining/establishing setpoint brake pressure p_setpoint, having a setpoint pressure rise which increases over time in particular at the start of the brake pressure buildup phase between times t1 and t1a, a great burden is prevented on the at least one pump used. It is therefore unnecessary to achieve a requested steep brake pressure buildup via a relatively high pump efficiency/pump speed of the at least one pump, while overcoming dead volume Vt of the braking system. It is sufficient instead if the at least one pump operates at comparatively low rotational speeds. Using the method described here, it is thus possible to reduce the risk of damage to the at least one pump.

Figure 1:
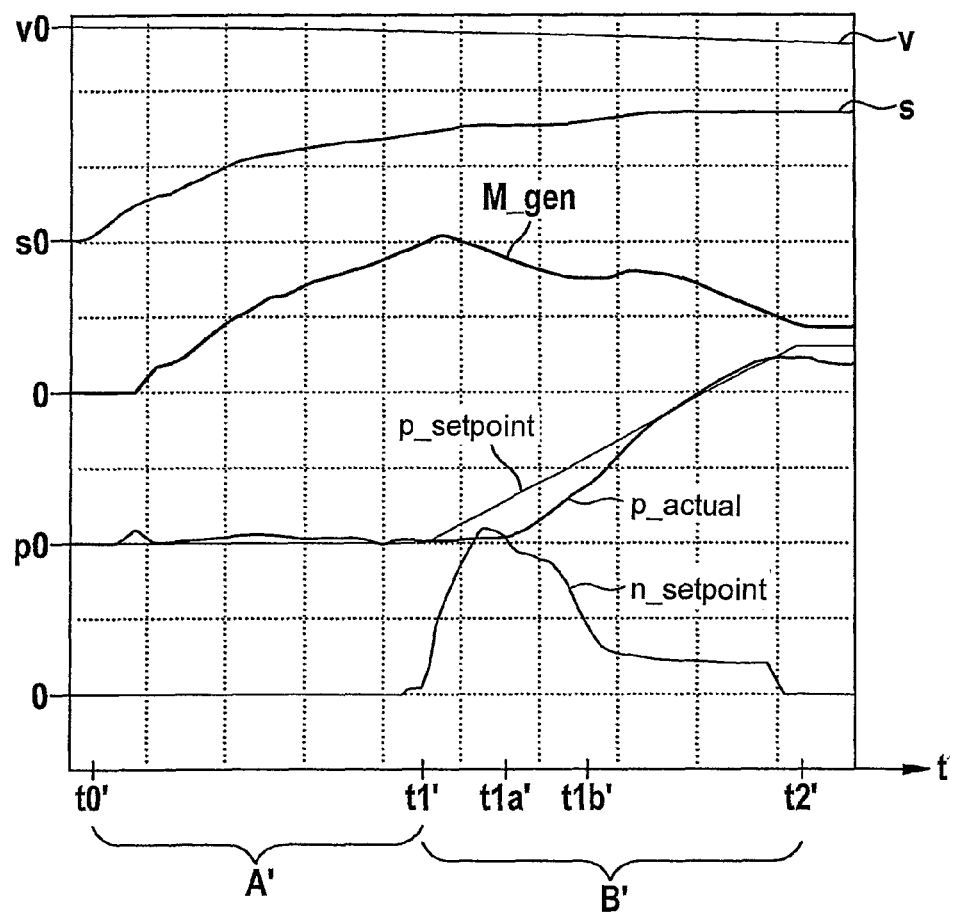
FIG. 1 shows a coordinate system for illustrating a traditional mode of operation of a braking system having a generator.

The at least one pump is also able to satisfy the requested rapid hydraulic brake pressure buildup between times t1 and t2 because of the advantageous activation of the method described here even when it operates at a rotational speed of less than 1500 revolutions per minute, in particular at less than 1000 revolutions per minute, which may be at less than 800 revolutions per minute, during a transitional phase from the fully regenerative braking mode to the fully hydraulic braking mode. As is apparent from a comparison of the different time intervals B' in FIG. 1 and B in FIG. 2a, the transition from the fully regenerative braking mode to the fully hydraulic braking mode is also more rapidly implementable by the method described here. The advantageous fully regenerative braking mode may thus be implemented for a longer period of time, as may be seen on the basis of a comparison of different time intervals A' from FIG. 1 and A from FIG. 2a.

Since the at least one pump does not implement any comparatively high pump efficiency/pump speeds during the time interval B, even a transition from the fully regenerative braking mode to the fully hydraulic braking mode is implementable with little noise and little vibration. It is therefore not necessary to shield occupants of the vehicle from pump noises and/or pump vibrations by using expensive insulation in the vehicle. The method described here thus offers advantageous driving comfort at a low cost.

In the specific embodiment of FIGS. 2a and 2b, a setpoint rotational speed n_setpoint which is constant over time is provided to the at least one pump. Instead of setpoint rotational speed n_setpoint, which is known over time, an operating current, which is constant over time, may also be output as the setpoint delivery output variable to the at least one pump. However, the implementability of the method described here is not limited to operation of the at least one pump at a constant rotational speed or such a rotational speed profile during a transition from the first braking mode into the second braking mode. For example, a setpoint rotational speed n_setpoint, which rises linearly over time starting from an initial rotational speed up to a target rotational speed and/or an operating current which rises linearly over time starting from an initial operating current up to a target operating current, is provided as the setpoint delivery output variable to the at least one pump during a transition from the first braking mode into the second braking mode. The procedure described here is also not limited to a linear rise in the increased parameter. A warmup-optimized activation profile for implementing the method described here may thus be used.

During the activation of the at least one pump via the established or predefined setpoint delivery output variable, generator braking torque M_gen of the generator may be reduced between times t1 and t2 at an established or predefined negative slope, the absolute value of which increases over time. It is thus possible to respond to the progressively increasing (hydraulic) pressure characteristic, which is induced by activating the pump between times t1 and t2 with a corresponding regressively declining generator braking torque characteristic.

In one advantageous specific embodiment, the setpoint delivery output variable is established or predefined according to a progressively rising pressure buildup graph during times t1 and t2. Furthermore, generator braking torque M_gen of the generator is reduced at the negative slope, the absolute value of which increases over time, in such a way that a time characteristic of generator braking torque M_gen corresponds to the braking torque graph regressively declining in relation to the progressively increasing pressure buildup graph. This is shown in FIG. 2a by generator braking torque M_gen, which is plotted between times t1 and t2.

During the activation of the at least one pump via the established or predefined setpoint delivery output variable, a setpoint generator braking torque of the generator may be established for this purpose, taking into account the total setpoint braking torque and a variable with respect to a hydraulic brake pressure built up in the at least one wheel brake cylinder and/or the at least one brake circuit. The at least one variable taken into account may be, for example, a hydraulic brake pressure, which is measured, estimated and/or derived with the aid of a theoretical model. Subsequently, generator braking torque M_gen of the generator may be set according to the established setpoint generator braking torque. Generator braking torque M_gen is advantageously regulated/reduced in such a way that the built up/increased total of the hydraulic braking torque in the at least one wheel brake cylinder and of reduced generator braking torque M_gen corresponds to the setpoint braking torque between times t1 and t2.

Figure 3:
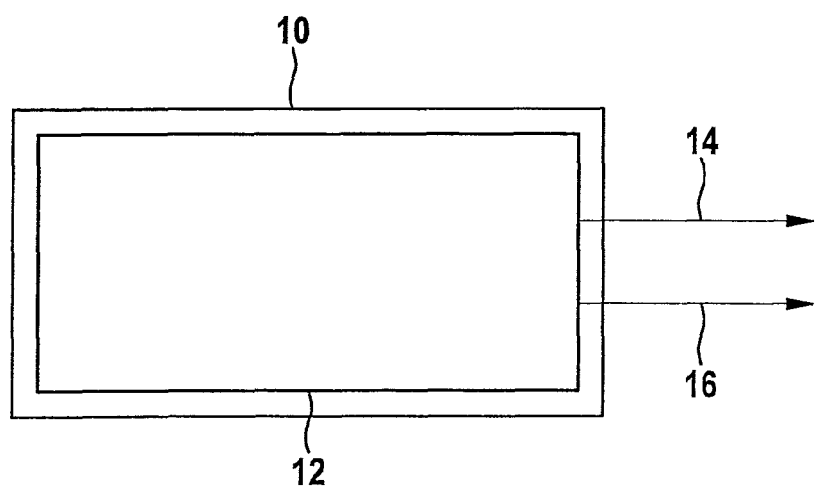
FIG. 3 shows a schematic illustration of one specific embodiment of the control unit.

FIG. 3 shows a schematic illustration of one specific embodiment of the control unit.

A regenerative braking system of a vehicle may be activated by using control unit 10, which is illustrated schematically in FIG. 3 in such a way that the method implemented above may be performed. It is pointed out that the applicability of the control unit is not limited to a certain type of regenerative braking system. A method for operating the regenerative braking system may also be implementable via the control unit, this method deviating from the method depicted in FIGS. 2a and 2b.

Control unit 10 has an activation device 12, using which at least one generator control signal 14 may be output to a generator (not shown) of the braking system, and a brake fluid delivery mechanism control signal 16 may be output to at least one brake fluid delivery mechanism (not shown) of the braking system. The braking system may be controlled by control signals 14 and 16 at least between a first braking mode and a second braking mode.

In the first braking mode, a generator braking torque of the generator, which is implementable on at least one wheel and/or one axle, is adjustable via generator control signal 14 which is not equal to zero and is equal to a first regenerative portion, predefined for the first braking mode, of a total setpoint braking torque predefined by the driver of the vehicle and/or an adaptive cruise control. For controlling the braking system out of the first braking mode into a second braking mode having a second regenerative portion, which is smaller than the first regenerative portion, the at least one brake fluid delivery mechanism is activatable via brake fluid delivery mechanism control signal 16 in such a way that brake fluid is pumpable via the at least one brake fluid delivery mechanism out of a storage volume of the braking system into the at least one wheel brake cylinder and/or the at least one brake circuit. In particular, a setpoint delivery output variable, which is established or predefined for a setpoint brake pressure having a setpoint pressure rise which increases over time, may be output to the brake fluid delivery mechanism via brake fluid delivery mechanism control signal 16. In this way, an actual brake pressure having an actual pressure rise which increases over time may be built up in the at least one wheel brake cylinder and/or the at least one brake circuit via the at least one brake fluid delivery mechanism which is activated via brake fluid delivery mechanism control signal 16.

For example, a setpoint rotational speed which is constant over time may be output to the at least one pump as the at least one brake fluid delivery mechanism via brake fluid delivery mechanism control signal 16. As an alternative or in addition, an operating current which is constant over time may be output as the setpoint delivery output variable to the at least one pump, as the at least one brake fluid delivery mechanism, via brake fluid delivery mechanism control signal 16. Likewise, a setpoint rotational speed which increases linearly over time starting from an initial rotational speed up to a target rotational speed and/or an operating current which increases linearly over time starting from an initial operating current up to a target operating current, may be output as the setpoint delivery output variable(s) to at least one pump with the aid of the brake fluid delivery mechanism control signal 16. Brake fluid delivery mechanism control signal 16 may also include other setpoint delivery output variables in addition to the variables mentioned here.

During the triggering of the at least one brake fluid delivery mechanism (via the established or predefined setpoint delivery output variable), a setpoint generator braking torque of the generator may be established by taking into account the total setpoint braking torque and a provided variable with respect to a hydraulic brake pressure which is built up in the at least one wheel brake cylinder and/or the at least one brake circuit, the generator braking torque being adjusted via generator control signal 14 in accordance with the established setpoint generator braking torque. In particular, the generator may be activatable by generator control signal 14 (during the triggering of the at least one brake fluid delivery mechanism via the established or predefined setpoint delivery output variable) in such a way that the generator braking torque may be reduced at an established or predefined negative slope, the absolute value of which increases over time.

Control unit 10 achieves the advantages already enumerated above, which are not described again here.

These advantages may also be implemented via a regenerative braking system for a vehicle by using control unit 10.

What is claimed is:

1. A method for operating a regenerative braking system of a vehicle, the method comprising:
providing a total setpoint braking torque that is predefined by one of a driver of the vehicle and an adaptive cruise control by:
operating the braking system, in a first braking mode, by providing a first regenerative portion of a generator braking torque from a generator; and controlling the braking system out of the first braking mode into a second braking mode by:
providing (i) a second regenerative portion of the generator braking torque from the generator and (ii) an actual brake pressure having an actual pressure rise which increases over time, and
triggering, by a setpoint delivery output variable, an at least one brake fluid delivery mechanism to establish a setpoint brake pressure having a setpoint pressure rise that has a time derivation increase over time, so that the actual brake pressure is built up in one of an at least one wheel brake cylinder and an at least one brake circuit;
wherein the second regenerative portion is smaller than the first regenerative portion,
wherein the setpoint delivery output variable is one of established and predefined for the setpoint brake pressure, and
wherein the setpoint pressure rise is implemented by pumping brake fluid from a storage volume of the braking system into a respective one of the at least one wheel brake cylinder and the at least one brake circuit, through the triggered brake fluid delivery mechanism.

2. The method of claim 1, wherein a setpoint generator braking torque of the generator is established during the triggering of the at least one brake fluid delivery mechanism, taking into account the total setpoint braking torque and a variable with respect to a hydraulic brake pressure which is built up in at least one of the at least one wheel brake cylinder and the at least one brake circuit, and the generator braking torque of the generator is adjusted accordingly.

3. The method of claim 1, wherein at least one of a setpoint rotational speed which is constant over time and an operating current which is constant over time is provided as the setpoint delivery output variable to at least one pump.

4. The method of claim 1, wherein at least one of a setpoint rotational speed, which increases linearly over time starting from an initial rotational speed up to a target rotational speed, and an operating current, which increases linearly over time starting from an initial operating current up to a target operating current, is provided as the setpoint delivery output variable to the at least one pump.

5. The method of claim 1, wherein during the triggering of the at least one brake fluid delivery mechanism, reducing the generator braking torque of the generator at an established or predefined negative slope, the absolute value of which increases over time.

6. The method of claim 5, wherein during the triggering of the at least one brake fluid delivery mechanism, reducing the generator braking torque of the generator so that a time characteristic of the generator braking torque corresponds to a regressively declining braking torque graph.

7. The method of claim 1, wherein the setpoint delivery output variable is established or predefined in accordance with a progressively increasing pressure buildup graph as the setpoint braking pressure having the setpoint pressure rise which increases over time.

8. The method of claim 1, wherein the braking system is operated in a fully regenerative braking mode as the first braking mode in which the first regenerative portion is equal to 100%.

9. The method of claim 1, wherein the generator braking torque is reduced to zero during the controlling of the braking system out of the first braking mode into the second braking mode, and wherein the braking system is then operated in a fully hydraulic braking mode as the second braking mode, in which the second regenerative portion is equal to 0%.

10. A control unit for a regenerative braking system of a vehicle, comprising:
an activation device that outputs:
an at least one generator control signal, which adjusts a generator braking torque, to a generator of the braking system, and
a brake fluid delivery mechanism control signal to at least one brake fluid delivery mechanism of the braking system to provide a total setpoint braking torque that is predefined by one of a driver of the vehicle and an adaptive cruise control by:
controlling the braking system into a first braking mode, by providing a first regenerative portion of the generator braking torque from the generator, and
controlling the braking system out of the first braking mode into a second braking mode by:
providing (i) a second regenerative portion of the generator braking torque from the generator and (ii) an actual brake pressure having an actual pressure rise which increases over time, and
triggering, by the brake fluid delivery mechanism control signal, an at least one brake fluid delivery mechanism to establish a setpoint brake pressure having a setpoint pressure rise that has a time derivation increase over time, so that the actual brake pressure is built up in one of an at least one wheel brake cylinder and an at least one brake circuit;
wherein the second regenerative portion is smaller than the first regenerative portion,
wherein a setpoint delivery output variable is one of established and predefined for the setpoint brake pressure, and the setpoint delivery output variable is output to the at least one brake fluid delivery mechanism via the brake fluid delivery mechanism control signal, and
wherein the setpoint pressure rise is implemented by pumping brake fluid from a storage volume of the braking system into a respective one of the at least one wheel brake cylinder and the at least one brake circuit, through the triggered at least one brake fluid delivery mechanism.

11. The control unit of claim 10, wherein during the triggering of the at least one brake fluid delivery mechanism, establishing a setpoint generator braking torque of the generator by taking into account the total setpoint braking torque and a provided variable with respect to a hydraulic brake pressure built up in at least one of the at least one wheel brake cylinder and the at least one brake circuit, and adjusting the generator braking torque in accordance with the established setpoint generator braking torque via the generator control signal.

12. The control unit of claim 10, wherein at least one of a setpoint rotational speed which is constant over time and an operating current which is constant over time is outputtable as the setpoint delivery output variable to an at least one pump via the brake fluid delivery mechanism control signal.

13. The control unit of claim 10, wherein at least one of a setpoint rotational speed increasing linearly over time starting from an initial rotational speed up to a target rotational speed and an operating current increasing linearly over time starting from an initial operating current up to a target operating current is outputtable as the setpoint delivery output variable to at least one pump via the brake fluid delivery mechanism control signal.

14. The control unit of claim 10, wherein during the triggering of the at least one brake fluid delivery mechanism, the generator is activatable via the generator control signal so that the generator braking torque is reducible at an established or predefined negative slope, the absolute value of which increases over time.

15. A regenerative braking system for a vehicle, comprising:
- a control unit for a regenerative braking system of a vehicle, including:
    - an activation device that outputs:
        - an at least one generator control signal, which adjusts a generator braking torque, to a generator of the braking system, and
        - a brake fluid delivery mechanism control signal to at least one brake fluid delivery mechanism of the braking system to provide a total setpoint braking torque that is predefined by one of a driver of the vehicle and an adaptive cruise control by:
            - controlling the braking system into a first braking mode, by providing a first regenerative portion of the generator braking torque from the generator, and
            - controlling the braking system out of the first braking mode into a second braking mode by:
                - providing (i) a second regenerative portion of the generator braking torque from the generator and
                - (ii) an actual brake pressure having an actual pressure rise which increases over time, and triggering, by the brake fluid delivery mechanism control signal, an at least one brake fluid delivery mechanism to establish a setpoint brake pressure having a setpoint pressure rise that has a time derivation increase over time, so that the actual brake pressure is built up in one of an at least one wheel brake cylinder and an at least one brake circuit;
- wherein the second regenerative portion is smaller than the first regenerative portion,
- wherein a setpoint delivery output variable is one of established and predefined for the setpoint brake pressure, and the setpoint delivery output variable is output to the at least one brake fluid delivery mechanism via the brake fluid delivery mechanism control signal, and
- wherein the setpoint pressure rise is implemented by pumping brake fluid from a storage volume of the braking system into a respective one of the at least one wheel brake cylinder and the at least one brake circuit, through the triggered at least one brake fluid delivery mechanism.

* * * * *